US012202190B2

United States Patent
Choi et al.

(10) Patent No.: US 12,202,190 B2
(45) Date of Patent: Jan. 21, 2025

(54) FILM ATTACHING DEVICE

(71) Applicant: SPIGEN KOREA CO., LTD., Seoul (KR)

(72) Inventors: Dong Kyung Choi, Seoul (KR); Ji Hye Kang, Namyangju (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 18/586,052

(22) Filed: Feb. 23, 2024

(65) Prior Publication Data

US 2024/0190063 A1 Jun. 13, 2024

(30) Foreign Application Priority Data

Jul. 11, 2023 (TW) .................................. 112207302
Feb. 6, 2024 (KR) ........................ 10-2024-0018192

(51) Int. Cl.
*B29C 63/00* (2006.01)
*B29C 63/02* (2006.01)

(52) U.S. Cl.
CPC ...... *B29C 63/0043* (2013.01); *B29C 63/0056* (2013.01); *B29C 63/0095* (2013.01); *B29C 63/02* (2013.01); *B29C 2063/0008* (2013.01)

(58) Field of Classification Search
CPC ......... A24F 40/10; A24F 40/46; A61M 15/06; B29C 63/0047; B29C 63/0056; B29C 63/0095

See application file for complete search history.

(56) References Cited

U.S. PATENT DOCUMENTS

| 2012/0110868 A1* | 5/2012 | Abbondanzio | B29C 63/02 33/645 |
| 2015/0277502 A1* | 10/2015 | Witham | H04B 1/3888 269/287 |
| 2021/0316497 A1* | 10/2021 | Zhang | B32B 27/283 |

FOREIGN PATENT DOCUMENTS

| KR | 10-1687343 B1 | 12/2016 |
| KR | 10-2364704 B1 | 2/2022 |

* cited by examiner

*Primary Examiner* — Alex B Efta
(74) *Attorney, Agent, or Firm* — Bridgeway IP Law Group, PLLC; Jihun Kim

(57) ABSTRACT

Proposed is the film attachment device including: a position setting plate including a main body in which a longitudinal hole extending in a forward-backward direction is formed, and a plurality of elastic members, first end portions of which protrude downward from the main body in a state of being arranged to be spaced apart in such a manner as to surround a position setting space, and second end portions of which extend upward toward the main body and come into close contact with a terminal being inserted into the position setting space; an auxiliary member in which first and second rectangular through-holes are formed to be positioned a predetermined distance apart in such a manner as to communicate with the longitudinal hole, and which is arranged on a lower surface of the main body; and a protective film arranged to cover bottoms of the first and second rectangular through-holes.

7 Claims, 9 Drawing Sheets

FILM ATTACHING DEVICE

CROSS REFERENCE TO RELATED APPLICATION

The present application claims priority to Taiwan Patent Application No. 112207302, filed on Aug. 18, 2023, and Korean Patent Application No. 10-2024-0018192, filed on Feb. 6, 2024, the entire contents of which are incorporated herein for all purposes by this reference.

BACKGROUND OF THE INVENTION

Field of the Invention

The present disclosure relates to film attachment device for attaching a film on a terminal, and more particularly, to a film attachment device for guiding dispersion adhesion of a protective film and a direction of attachment thereof in a case where the protective film is attached on a display of a terminal.

Background Art

In recent years, there have been various types of terminals equipped with touch screens, such as a vehicular touch screen display, a smartphone, a tablet PC, and a navigation device. Electronic devices operate by a user's finger touching on a touch screen display. Touch screens have ever-increasing areas to enhance user convenience.

Protective films are used to protect displays against damage or scratches occurring due to shock or friction, and, typically, are manufactured of glass or plastic material.

However, the need for attachment in a short time and the care for prevention of introduction of foreign material between the protective film and the display make it very difficult to accurately attach the protective film to the display.

Particularly, disadvantages with the protective film are that static electricity normally occurs while a release paper is removed from the bottom surface of the protective film, and that air bubbles may occur while the protective film is attached. Furthermore, it is difficult to remove the air bubbles once they are formed.

To overcome these disadvantages, devices for assisting in the attachment of the protective film are available on the market. With these devices, users can readily attach the protective film to the display.

Most of these devices are configured to include protrusions holding in a surrounding manner corners thereof that correspond to corners of a protection-target display. These protrusions guide aligning and attaching of the protective film to the protection-target display while the protective film is attached on the display.

Most of these devices are manufactured in such a manner as to be used according to the following order. First, the center portion of the protective film is attached on the display by pressing against the center portion of the protective film. Then, the other portions are attached on the display.

An adhesive agent on this protective film is formed of polymer material. Dispersion adhesion proceeds with the passage of time and by pressure application. The dispersion adhesion refers to adhesion that, with an adhesive force of the protective film, disperses between the protective film and the display from the center portion of the protective film to four corners thereof and correspondingly increases an adhesion area between the protective film and the display.

The speed of this dispersion adhesion varies according to an influence that the flatness of the protective film, static electricity, temperature, and pressure exert. However, in recent years, the technologies for controlling the flatness of the protective film have reached a maturity level. Environmental factors, such as static electricity and temperature, have little influence on the speed of the dispersion adhesion.

Therefore, pressure is a factor that has the most direct influence on the speed of the dispersion adhesion of the protective film on the display. The higher pressure applied to the protective film, the greater attachment area of the protective film and the higher speed of the dispersion adhesion of the protective film.

However, a disadvantage with the dispersion adhesion is that air bubble may occur between the protective film and the display when corner and edge portions of the protective film are primarily adhered to corresponding corner and edge portions of the display while the protective film is adhered up to four corners of the display in a dispersing manner.

The related art of the present disclosure is disclosed in Korean Patent Nos. 10-1687343 and 10-2364704 entitled "SMARTPHONE DISPLAY PROTECTION GUIDE JIG" and "SLIDING GUIDE FRAME FOR SMARTPHONES THAT GUIDES LIQUID CRYSTAL FILM TO BE ATTACHED AND ALIGNED WITH SMARTPHONE WHILE FIXING SMARTPHONE," respectively.

However, the related art does not disclose the technology that an adhesion area between the protective film and the display increases in the direction from the center portion of the display to the corners and edges thereof.

DESCRIPTION OF THE RELATED ART

Document of Related Art (Patent Document 1) Korean Patent No. 10-1687343
(Patent Document 2) Korean Patent No. 10-2364704

SUMMARY OF THE INVENTION

An object of the present disclosure is to provide a film attachment device for guiding increasing of an adhesion area between a protective film and a display in the direction from the center portion of the display to the corners and edges thereof.

In addition, the present disclosure is not limited to the above-mentioned object. Other objects would be obviously derived from the following description.

According to one aspect of the present disclosure, there is provided a film attachment device including: a position setting plate including a main body in the center portion of which a longitudinal hole extending in a forward-backward direction is formed, and a plurality of elastic members, first end portions of which protrude downward from the main body in a state of being arranged to be spaced apart from each other in such a manner as to surround a position setting space, and second end portions of which extend upward toward the main body in the opposite direction and come into close contact with a terminal being inserted into the position setting space; an auxiliary member in which first and second rectangular through-holes are formed to be positioned a predetermined distance apart from each other in such a manner as to communicate with the longitudinal hole, and which is arranged on a lower surface of the main body;

and a protective film arranged to cover bottoms of the first and second rectangular through-holes.

In the film attachment device, an attachment, which is a lower surface of the protective film, may be spaced a predetermined distance apart from a display of the terminal in a state where the terminal is inserted into the position setting space.

In the film attachment device, the first and second rectangular through-holes may be formed to be spaced apart from each other in front and rear directions, respectively.

In the film attachment device, when an external force moves in a forward-backward direction in a state of pressing against the protective film or the auxiliary member through the longitudinal hole, the protective film may be adhered to the display in a dispersing manner from the center thereof up to an edge thereof.

In the film attachment device, a first one-side-open rectangular through-hole may be formed by recessing one front portion of the auxiliary member, which is adjacent to the first rectangular through-hole, and a second one-side-open rectangular through-hole may be formed by recessing one rear portion of the auxiliary member, which is adjacent to the second rectangular through-hole.

In the film attachment device, one front portion and one rear portion of the protective film may be exposed to space over the auxiliary member through the first and second one-side-open rectangular holes, respectively.

In the film attachment device, the position setting plate may include a guide unit coupled, at a position spaced apart from the position setting space, to the lower surface of the main body.

In the film attachment device, a protrusion that passes through the auxiliary member and is coupled to the auxiliary member may be formed on the lower surface of the main body.

The film attachment device according to an embodiment of the present disclosure, which is disclosed in the present specification, provides the advantage of attaching the protective film by a simple operation of moving a user's finger in one direction in a state where the auxiliary member is pressed against by the user's finger.

In addition, the film attachment device provides the advantage of discharging air bubbles and foreign material present between the protective film and the display and attaching the protective film to the display accurately and quickly by an operation of moving the user's finger in one direction.

Moreover, regardless of whether or not the inventor recognizes the above-mentioned advantages of the present disclosure, they can be inherently achieved by the described configuration of the present disclosure. Thus, the above-mentioned advantages serve as exemplary examples in light of the present specification, and should not be recognized as being exhaustive.

In addition, an advantage of the present disclosure would be additionally derived from the present specification. Any advantage that, although not explicitly described, is apparent from the present specification to a person of ordinary skill in the art to which the present disclosure pertains should be regarded as being described in the present disclosure.

DETAILED DESCRIPTION OF THE INVENTION

Figure 1:
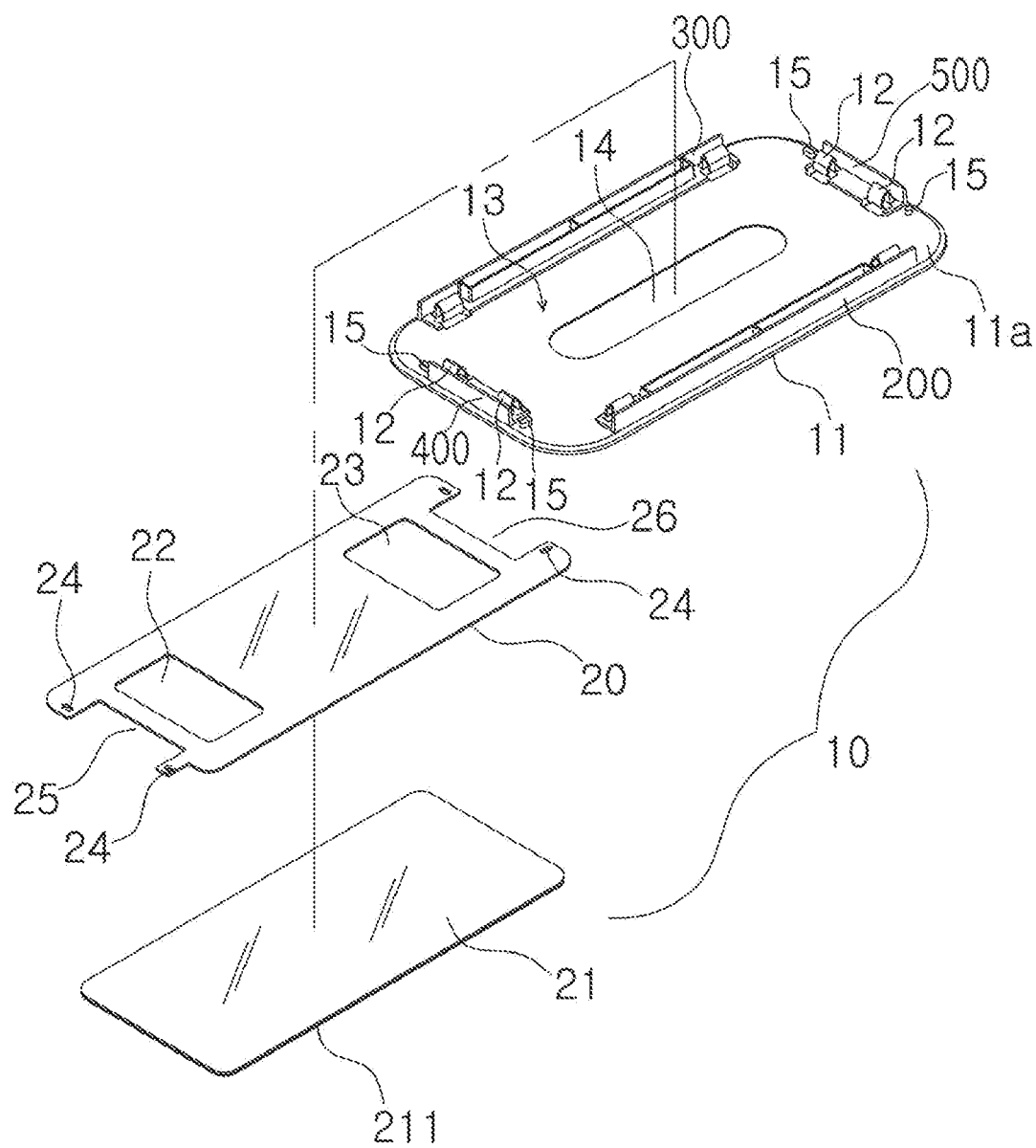
FIG. 1 is an exploded perspective view illustrating a film attachment device according to an embodiment of the present disclosure.

A configuration, an operation, and an operational effect of a film attachment device according to a preferred embodiment of the present disclosure will be described below with reference to the accompanying drawings. It is noted that, for purposes of convenience and clarity, constituent elements are omitted from the drawings or are schematically illustrated therein and that constituent elements illustrated are not in proportional to their actual sizes. In addition, the same constituent elements are depicted by the same reference numeral throughout the specification, and the reference numeral that depicts the same constituent elements is omitted from the individual drawing.

With reference to FIGS. 1 to 9, a film attachment device 10 includes a position setting plate 11, an auxiliary member 20, and a protective film 21 having an attachment surface 211 formed as the lower surface thereof.

The position setting plate 11 includes a main body 11a, a plurality of elastic members 12, a first guide unit 200, a second guide unit 300, a third guide unit 400, and a fourth guide unit 500. A first long shaft 110, a second long shaft 120, a first short shaft 130, and a second short shaft 140 are formed on the position setting plate 11.

Figure 2:
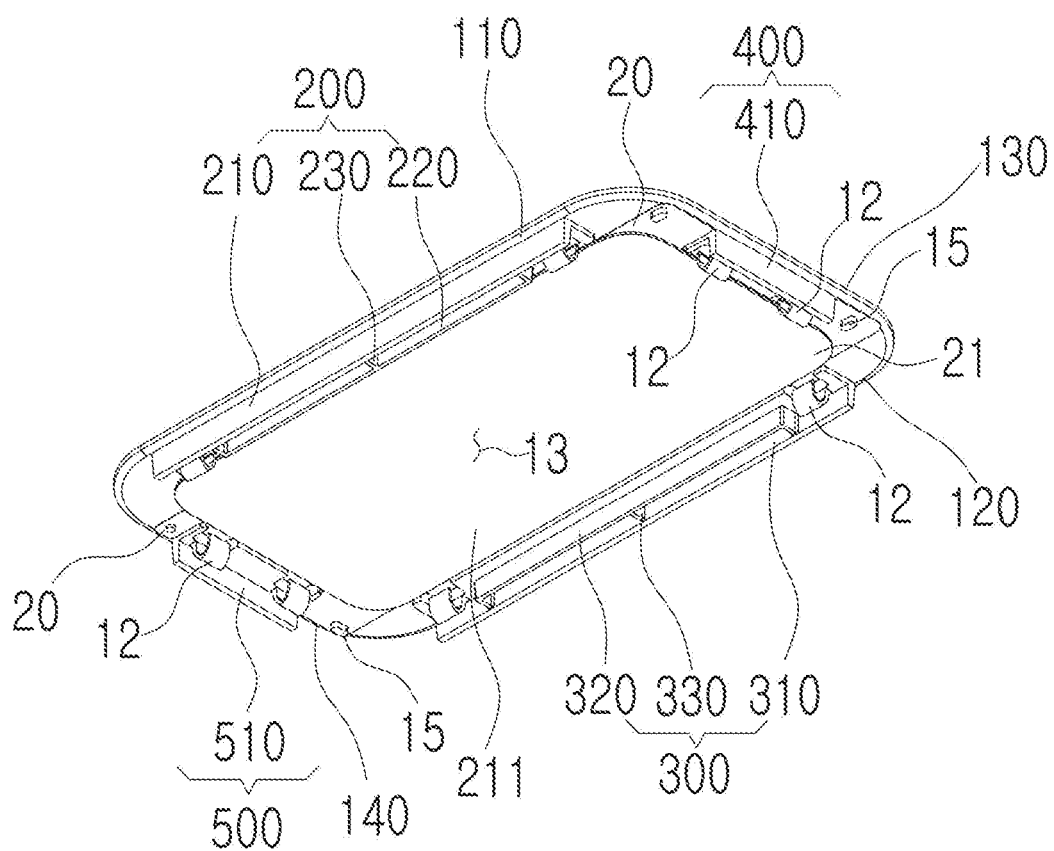
FIG. 2 is a perspective view illustrating a state where a position setting plate, an auxiliary member, and a protective film in FIG. 1, which are coupled to each other, are not yet coupled to a terminal.

With reference to FIG. 2, the first guide unit 200 includes a first lower guide 210, a first guide 220, and a first reinforcement member 230. Furthermore, the second guide unit 300 includes a second lower guide 310, a second guide 320, and a second reinforcement member 330. Furthermore, the third guide unit 400 includes a third lower guide 410, and the fourth guide unit 500 includes a fourth lower guide 510.

The main body 11a is manufactured in the shape of a rectangle that extends over a long distance in the forward-backward direction. The first and second long shafts 110 and 120 are formed on first and second sides, respectively, of the bottom surface of the main body 11a. The first and second short shafts 130 and 140 are formed on the rear and front sides, respectively, of the bottom surface of the main body 11a.

The first guide unit 200, the second guide unit 300, the third guide unit 400, and the fourth guide unit 500 are formed on the first long shaft 110, the second long shaft 120, the first short shaft 130, and the second short shaft 140, respectively. One or more elastic member 12 are coupled to each of the first guide unit 200, the second guide unit 300, the third guide unit 400, and the fourth guide unit 500.

The elastic members 12, formed on the first and second long shafts 110 and 120, respectively, are arranged in such a manner as to face each other. In this state, the elastic members 12 are coupled to the first and second guide units 200 and 300, respectively. When a terminal 1 is inserted between the first and second long shafts 110 and 120, the elastic members 12 press against both lateral surfaces, respectively, of the terminal 1.

The elastic members 12, formed on the first and second short shafts 130 and 140, respectively, are arranged in such a manner as to face each other. In this state, the elastic members 12 are coupled to the third and fourth guide units 400 and 500, respectively. When the terminal 1 is inserted into a position setting space 13, the elastic members 12 press against a rear surface and a front surface, respectively, of the terminal 1.

The elastic members 12 coupled to the main body 11a press against both lateral surfaces, respectively, of the terminal 1, thereby fixing a position of the terminal 1 and guiding attachment of the protective film 21 at a required position of the protective film 21 on a display 2.

The required position of the protective film 21 on the display 2 at which the protective film 21 is attached refers to the arrangement of an upper surface of the display 2 underneath the attachment surface 211 of the protective film 21 in a state where the centerline of the protective film 21 and the centerline of the display 2 are on the same vertical line.

Respective first end portions of the plurality of elastic members 12 protrude downward from the main body 11a in a state where the respective first end portions are arranged to be spaced apart from each other in such a manner as to surround the position setting space 13. Respective second end portions thereof extend toward the main body 11a in a bent manner and come into close contact with the terminal 1 inserted into the position setting space 13.

The elastic members 12, coupled to the main body 11a at positions corresponding to the first and second short shafts 130 and 140, respectively, are arranged to face each other. The respective second end portions of the plurality of elastic members 12, positioned on the first and second short shafts 130 and 140, respectively, are formed to extend up to a range of the position setting space 13.

The elastic members 12, formed on the first and second long shafts 110 and 120, respectively, are arranged to face each other. The respective second end portions of the plurality of elastic members 12, formed on the first and second long shafts 110 and 120, respectively, are formed to extend up to the range of the position setting space 13.

A longitudinal hole 14, formed to be in parallel with the first and second long shafts 110 and 120, is positioned in the center portion of the position setting plate 11.

The longitudinal hole 14 communicates with the position setting space 13. A first rectangular through-hole 22 is formed in a front portion of the auxiliary member 20 positioned under the position setting plate 11, and a second rectangular through-hole 23 is formed in a rear portion of the auxiliary member 20 positioned under the position setting plate 11.

The first guide unit 200 is coupled to a lower surface of the main body 11a between the first long shaft 110 and the position setting space 13. The first guide unit 200 blocks the terminal 1, inserted into the position setting space 13, from moving excessively in a first-side direction.

Specifically, the first lower guide 210 is formed in such a manner that one end portion thereof extends over a long distance in the forward-backward direction. An upper surface of the first lower guide 210 is surface-coupled to the bottom surface of the main body 11a that is adjacent to the first long shaft 110.

A second end portion of the first lower guide 210 covers a first side of the elastic member 12. One first-side edge part of a first end portion of the elastic member 12 extends toward downward over a predetermined distance and is coupled to the main body 11a at the first long shaft 110.

First end portions of the elastic members 12 that are coupled to the main body 11a at the first long shaft 110 are connected to the main body 11a within a plurality of through-holes, respectively. The plurality of through-holes are formed by recessing end-portion parts, respectively, of the first lower guide 210.

The first guide 220 is formed in the shape of a vertical plate that extends over a long distance in the forward-backward direction and has a relatively wide area arranged toward first and second sides. The first guide 220 is connected to a first end portion of the first lower guide 210 in a state where the first guide 220 is spaced a predetermined distance apart in a second-side direction from the second end portion of the first lower guide 210.

A plurality of the first reinforcement members 230 are formed in the shape of a rectangular plate that extends in the upward-downward direction. The plurality of the first reinforcement members 230 are manufactured in such a manner that the plurality of the first reinforcement members 230 are spaced a predetermined distance apart in the forward-backward direction from each other between the second end portion of the first lower guide 210 and the first guide 220 and connect the first lower guide 210 and the first guide 220 to each other.

The second guide unit 300 is coupled to the lower surface of the main body 11a between the second long shaft 120 and the position setting space 13. The second guide unit 300 blocks the terminal 1, inserted into the position setting space 13, from moving excessively in the second-side direction.

The second lower guide 310 is formed in such a manner that a first end portion thereof extends over a long distance in the forward-backward direction. An upper surface of the second lower guide 310 is surface-coupled to the bottom surface of the main body 11a that is adjacent to the second long shaft 120.

A second end portion of the second lower guide 310 covers a second side of the elastic member 12. One second-side edge part of a first end portion of the elastic member 12 extends toward downward over a predetermined distance and is coupled to the main body 11a at the second long shaft 120.

First end portions of the elastic members 12 that are coupled to the main body 11a at the second long shaft 120 are connected to the main body 11a within a plurality of through-holes, respectively. The plurality of through-holes are formed by recessing parts, respectively, of the second lower guide 310.

The second guide 320 is formed in the shape of a vertical plate that extends over a long distance in the forward-backward direction and has a relatively wide area arranged toward the first and second sides. The second guide 320 is connected to a first end portion of the second lower guide 310 in a state where the second guide 320 is spaced a predetermined distance apart in the first-side direction from the second end portion of the second lower guide 310.

A plurality of the second reinforcement members 330 are formed in the shape of a rectangular plate that extends in the upward-downward direction. The plurality of the second reinforcement members 330 connect the second lower guide 310 and the second guide 320 to each other between the second end portion of the second lower guide 310 and the second guide 320 in a state where the plurality of the second reinforcement members 330 are spaced a predetermined distance apart in the forward-backward direction from each other.

The third guide unit 400 is coupled to the lower surface of the main body 11*a* between the first short shaft 130 and the position setting space 13. The third guide unit 400 blocks the terminal 1, inserted into the position setting space 13, from moving excessively toward backward.

Specifically, the third lower guide 410 is formed in such a manner that a first end portion thereof extends over a long distance toward the first and second sides. An upper surface of the third lower guide 410 is surface-coupled to the bottom surface of the main body 11*a* that is adjacent to the first short shaft 130.

A second end portion of the third lower guide 410 covers the rear of the elastic member 12. A rear edge part of a first end portion of the elastic member 12 is formed to extend toward downward over a predetermined distance and is coupled to the main body 11*a* at the first short shaft 130.

The fourth guide unit 500 is coupled to the lower surface of the main body 11*a* between the second short shaft 140 and the position setting space 13. The fourth guide unit 500 blocks the terminal 1, inserted into the position setting space 13, from moving excessively toward forward.

Specifically, the fourth lower guide 510 is formed in such a manner that a first end portion thereof extends over a long distance toward the first and second sides. An upper surface of the fourth lower guide 510 is surface-coupled to the bottom surface of the main body 11*a* that corresponds to the second short shaft 140.

A second end portion of the fourth lower guide 510 covers the front of the elastic member 12. One front edge part of a first end portion of the elastic member 12 is formed to extend toward downward over a predetermined distance and is coupled to the main body 11*a* at the second short shaft 140.

Figure 3:
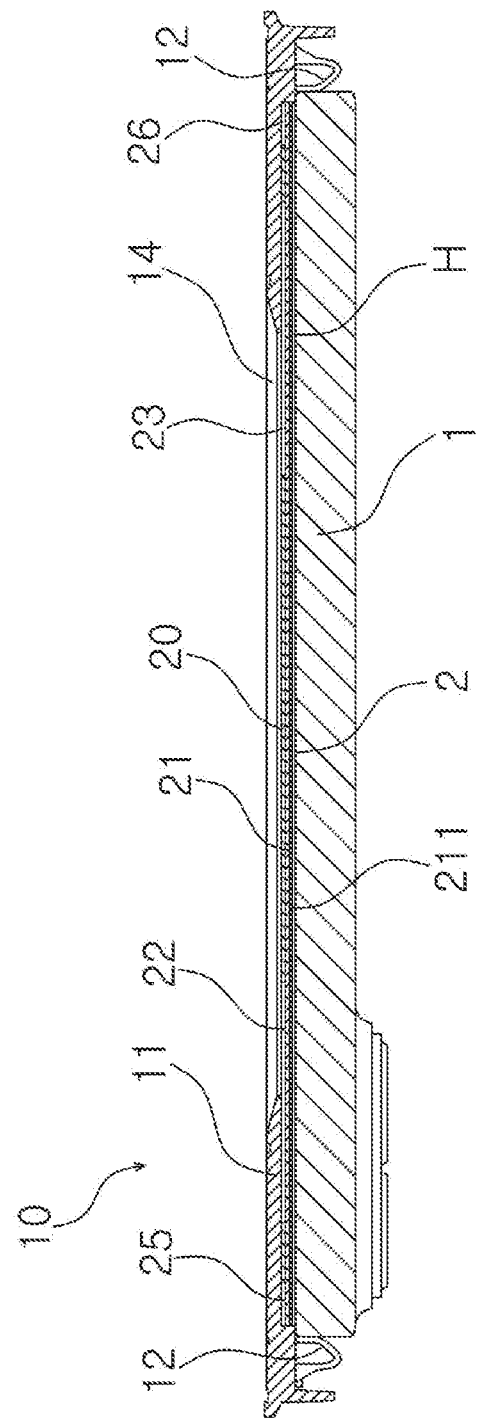
FIG. 3 is a vertical cross-sectional view illustrating a state where the film attachment device in FIG. 1 is coupled to the terminal.

With reference to FIGS. 2 and 3, in a state where the auxiliary member 20 and the protective film 21 are arranged on the lower surface of the main body 11*a*, the protective film 21 is arranged in such a manner that the attachment surface 211 thereof is on a higher horizontal line than the bottom surface of the first end portion of the first lower guide 210, the bottom surface of the first end portion of the second lower guide 310, the bottom surface of a first end portion of the third lower guide 410, and the bottom surface of a first end portion of the fourth lower guide 510.

With reference to FIGS. 2 and 3, the position setting plate 11, the auxiliary member 20, and the protective film 21 are lowered, and the terminal 1 is inserted into the position setting space 13, thereby coming into close contact with the second end portions of the elastic members 12. In this state, one portion of an upper surface of the terminal 1 comes into contact with the bottom surfaces of the respective first end portions of the first lower guide 210, the second lower guide 310, the third lower guide 410, and the fourth lower guide 510.

The terminal 1 comes into close contact with the first lower guide 210, the second lower guide 310, the third lower guide 410, and the fourth lower guide 510. As a result, the attachment surface 211 of the protective film 21 is spaced a distance H apart from the display 2.

One portion of a surface of the protective film 21 arranged on a lower surface of the auxiliary member 20 is exposed to the outside through the first rectangular through-hole 22 and the second rectangular through-hole 23.

A plurality of third through-holes 24 are formed by recessing portions, respectively, of the auxiliary member 20. A plurality of protrusions 15, formed on the position setting plate 11, are inserted into the plurality of third through-holes 24, respectively, and thus the auxiliary member 20 is coupled to the position setting plate 11.

With reference to FIG. 1, a first one-side-open rectangular through-hole 25 is formed by recessing one front portion of the auxiliary member 20, which is adjacent to the first rectangular through-hole 22, in such a manner as to be spaced a distance apart from the first rectangular through-hole 22. One portion of an upper surface of the protective film 21 is exposed to space over the auxiliary member 20 through the first one-side-open rectangular through-hole 25.

A second one-side-open rectangular through-hole 26 is formed by recessing one rear portion of the auxiliary member 20, which is adjacent to the second rectangular through-hole 23, in such a manner as to be spaced a distance apart from the second rectangular through-hole 23. One portion of the upper surface of the protective film 21 is exposed to space over the auxiliary member 20 through the second one-side-open rectangular through-hole 26.

Figure 5:
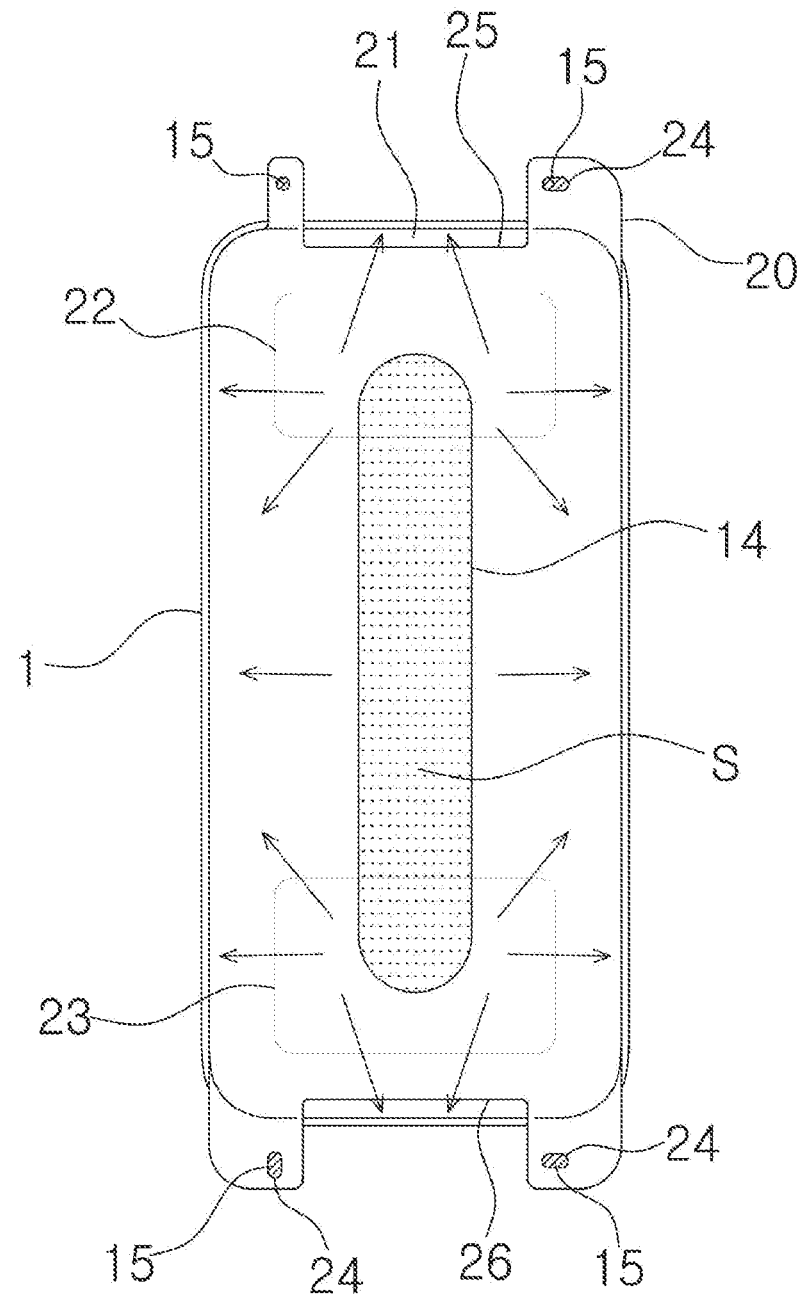
FIG. 5 is a top view illustrating a direction of guiding dispersion adhesion that proceeds while the electrostatic protective film in FIG. 4 is attached to the display with the user's finger.

With reference to FIG. 5, the first one-side-open rectangular through-hole 25 is formed to have a relatively smaller width in first and second side directions than the first rectangular through-hole 22.

In addition, with reference to FIG. 5, the second one-side-open rectangular through-hole 26 is formed to have a relatively smaller width in the first and second side directions than the second rectangular through-hole 23.

The insertion of the plurality of protrusions 15 into the plurality of third through-holes 24, respectively, on the lower portion of the main body 11*a* arranges the auxiliary member 20 to come into contact with the bottom surface of the main body 11*a* and arranges the protective film 21 to come into contact with the lower surface of the auxiliary member 20 within the position setting space 13.

With reference to FIG. 3, in a state where the terminal 1 is inserted into the position setting space 13 by lowering the position setting plate 11, the attachment surface 211 of the protective film 21 is spaced a predetermined distance H apart from the display 2 of the terminal 1.

Specifically, the terminal 1 is accommodated within the position setting space 13 in the film attachment device 10 in a manner that faces upward. The predetermined distance H is secured between the attachment surface 211 of the protective film 21 and the display 2.

At this point, a user inserts the user's finger 3 into the longitudinal hole 14 extending over a long distance in the forward-backward direction and then moves the user's finger 3 in a linear direction from the first rectangular through-hole 22 to the second rectangular through-hole 23, with the auxiliary member 20 and the protective film 21 being pressed with the user's finger 3. As a result, dispersion adhesion S is fostered between the attachment surface 211 and the display 2.

The auxiliary member 20 does not cause interference in a case where the protective film 21 is pressed with the user's finger 3 at positions of the first rectangular through-hole 22, the second rectangular through-hole 23, the first one-side-open rectangular through-hole 25, and the second one-sideopen rectangular through-hole 26. Because of this, a downward adhesion pressure increases, and a speed of dispersion adhesion S increases.

The increase in the speed of the dispersion adhesion S finally causes the adhesion to disperse in a corner direction of the protective film 21 and facilitates discharging of air bubbles between the attachment surface 211 and the display 2 to the outside.

A configuration and a function of the embodiment are described in detail as follows.

As illustrated in FIGS. 1 to 8, the protective film 21 may be manufactured of tempered glass material or plastic sheet material that is resistant to degradation and scratches. The attachment surface 211, the lower surface of the protective film 21, may be manufactured from a polymer material.

A change in the downward adhesion pressure applied through the longitudinal hole 14 to the auxiliary member 20 or the protective film 21 causes a change in the speed of the dispersion adhesion S between the attachment surface 211 of the protective film 21 and the display 2.

The auxiliary member 20 may be manufactured of plastic material. The position setting plate 11 may be manufactured of high-intensity plastic material, but is not limited thereto.

The longitudinal hole 14 is positioned in an upper surface of the auxiliary member 20. The longitudinal hole 14 is formed to have such a width in the first and second directions that the user's finger 3 can pass through the longitudinal hole 14 and to have a relatively greater length in the forward-backward direction than the main body 11a between the first rectangular through-hole 22 and the second rectangular through-hole 23.

Accordingly, openings of the first rectangular through-hole 22 and the second rectangular through-hole 23, which are exposed to the outside through the longitudinal hole 14, may be different in shape from each other. It is possible to change the shapes of the openings of the first rectangular through-hole 22 and the second rectangular through-hole 23 according to a position of the auxiliary member 20.

In a case where the protective film 21 is attached on the display 2, the terminal 1 is positioned on a plane in such a manner that the display 2 faces upward, and the terminal 1 is arranged within the position setting space 13 by lowering the position setting plate 11. When this is done, the respective second end portions of the plurality of elastic members 12 come into close contact with an external lateral surface of the terminal 1.

When the respective second end portions of the plurality of elastic members 12 come into close contact with the external lateral surface of the terminal 1, with an elastic force of the plurality of elastic members 12, the terminal 1 is fastened at a required position of the terminal 1 within the position setting space 13. The display 2 of the terminal 1 is spaced the distance H apart from the protective film 21.

Figure 4:
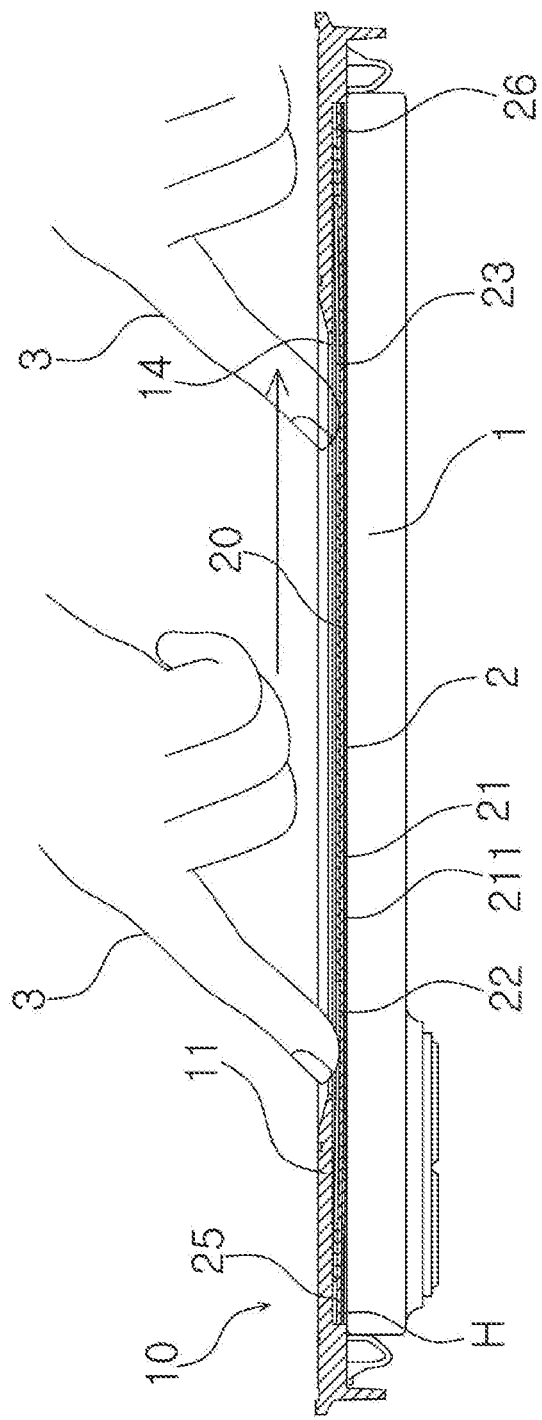
FIG. 4 is a schematic view illustrating a process of attaching an electrostatic protective film to a display with a user's finger in a state where the film attachment device in FIG. 1 is coupled to the terminal.

With reference to FIGS. 3 and 4, in a state where the respective second end portions of the plurality of elastic members 12 come into close contact with the internal lateral surface of the terminal 1, the position of the terminal 1 is fixed, and the protective film 21 is arranged at an exactly corresponding position on the upper surface of the display 2 to be spaced the distance H apart from the upper surface thereof.

When the protective film 21 is pushed from the front of the longitudinal hole 14 with the user's finger 3, one portion of the attachment surface 211 of the protective film 21 comes into contact with the display 2. When the user's finger 3 is pushed from the front of the longitudinal hole 14 to the rear thereof, the remaining portions of the attachment surface 211 of the protective film 21 are attached on the display 2.

At this point, in a state where the plurality of third through-holes 24 are coupled to the plurality of protrusions 15, respectively, an upward tensional force acts on one first side portion and one second side portion of the center of the auxiliary member 20 pressed by the user's finger 3.

An upward tensional force also occurs on the protective film 21 attached on the lower surface of the auxiliary member 20, and thus, the effect of the dispersion adhesion S between the attachment surface 211 and the display 2 starts to occur.

Specifically, with reference to FIG. 5, when the center portion of the auxiliary member 20 is pressed by the user's finger 3, the center portion of the auxiliary member 20 and the protective film 21 are lowered. Simultaneously, one portion of each of the first and second sides of the auxiliary member 20 moves upward, and one portion of each of the first and second sides of the protective film 21 moves upward. As a result, a phenomenon of the upward tensional force that moves away the display 2 occurs.

However, the downward adhesion pressure to the display 2 by the attachment surface 211 of the protective film 21 is relatively greater than the upward tensional force. Because of this, in the order illustrated in FIGS. 5 to 8, the effect of the dispersion adhesion S proceeds between the protective film 21 and the display 2.

Therefore, the upward tensional force of the auxiliary member 20 cancels out the downward adhesion pressure of the attachment surface 211 to the display 2. Thus, the downward adhesion pressure is reduced by the upward tensional force of the auxiliary member 20 at one or several points at which the auxiliary member 20 comes into close contact with the protective film 21, and the speed of the dispersion adhesion S decreases.

In contrast, in a case where the protective film 21 is pressed at the positions of the first rectangular through-hole 22, the second rectangular through-hole 23, the first one-side-open rectangular through-hole 25, and the second one-side-open rectangular through-hole 26, the protective film 21 is pressed with a normal pressure without being influenced by the upward tensional force of the auxiliary member 20. As a result, the speed of the dispersion adhesion S is higher than in a case where the auxiliary member 20 and the protective film 21 are pressed together.

That is, a difference in the downward adhesion pressure and the like between the attachment surface 211 and the display 2 occurs depending on whether or not the first rectangular through-hole 22, the second rectangular through-hole 23, the first one-side-open rectangular through-hole 25, and the second one-side-open rectangular through-hole 26 are present. Thus, the speed of the dispersion adhesion S changes, thereby guiding a direction of the dispersion adhesion S.

Specifically, with reference to FIG. 5, according to the present disclosure, when the movement of the user's finger 3 pressing against the longitudinal hole 14 causes the attachment surface 211 within a region of the longitudinal hole 14 to be attached on the display 2, the adhesion of the attachment surface 211 gradually disperses in the directions of the first and second short shafts 130 and 140.

At this point, because each of the first and second short shafts 130 and 140 is shorter than one of the first and second long shafts 110 and 120, the protective film 21 is quickly fully attached up to an edge of the display 2.

In addition, in the case of the first and second long shafts 110 and 120, the speed of the dispersion adhesion S is high at the first rectangular through-hole 22 and the second rectangular through-hole 23. As a result, the protective film 21 is quickly fully attached up to the edge of the display 2 along the directions of the first and second long shafts 110 and 120.

In addition, a normal pressure is maintained at positions of the first one-side-open rectangular through-hole 25 and the second one-side-open rectangular through-hole 26, and the first one-side-open rectangular through-hole 25 has a smaller width than the first rectangular through-hole 22. As a result, the dispersion adhesion S of the protective film 21 proceeds in the direction from the first rectangular through-hole 22 to the first one-side-open rectangular through-hole 25.

Figure 6:
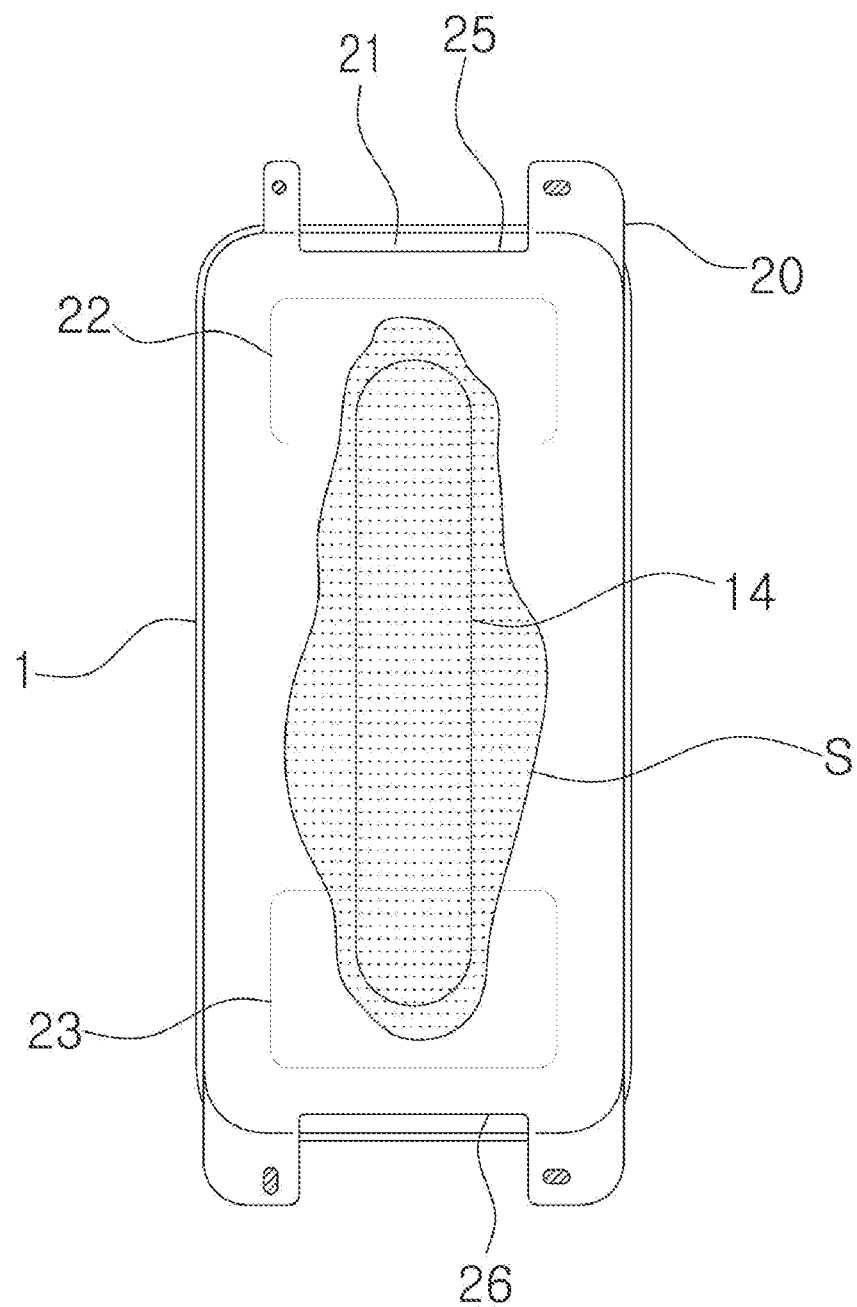
FIGS. 6 to 8 are schematic views illustrating, each illustrating a change in a state of the dispersion adhesion that proceeds while the electrostatic protective film is attached to the display with the user's finger.
Figure 7:
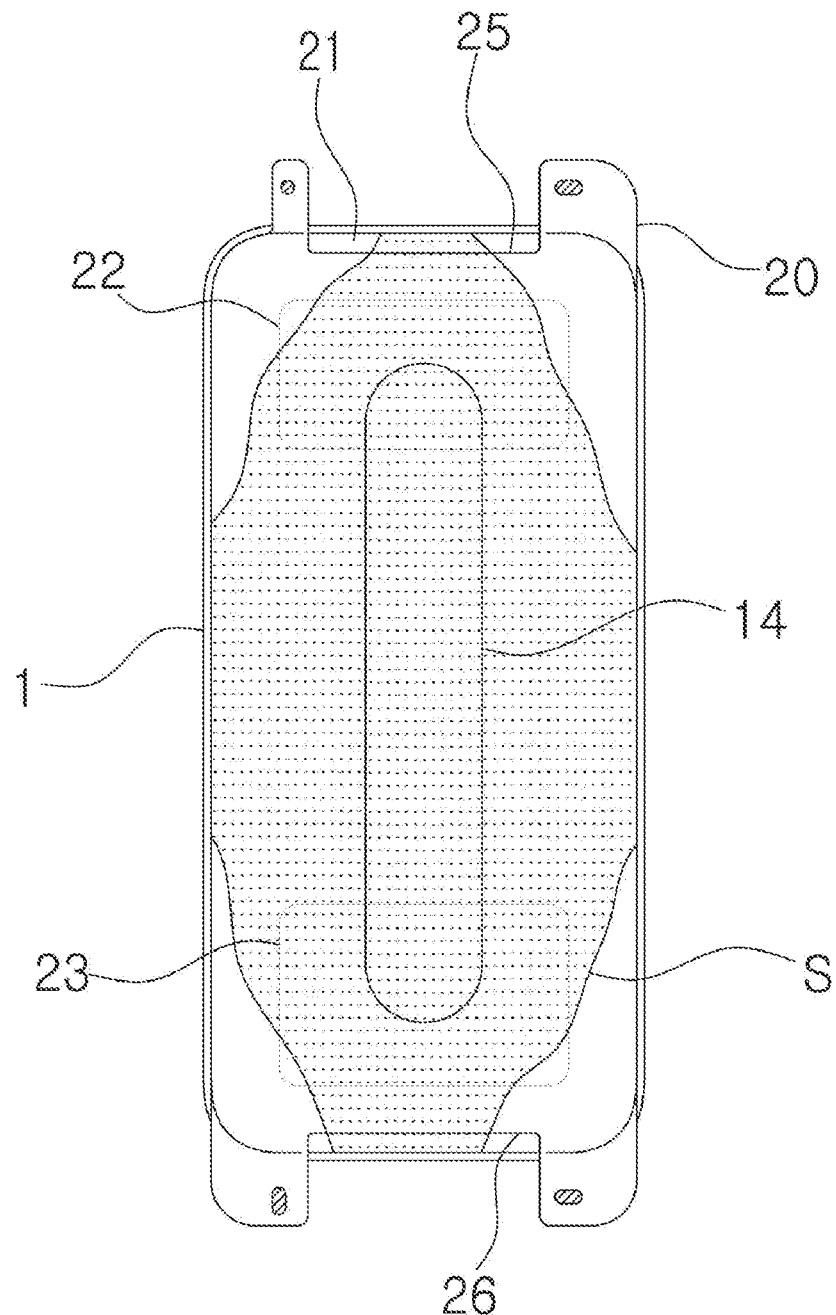
Figure 8:
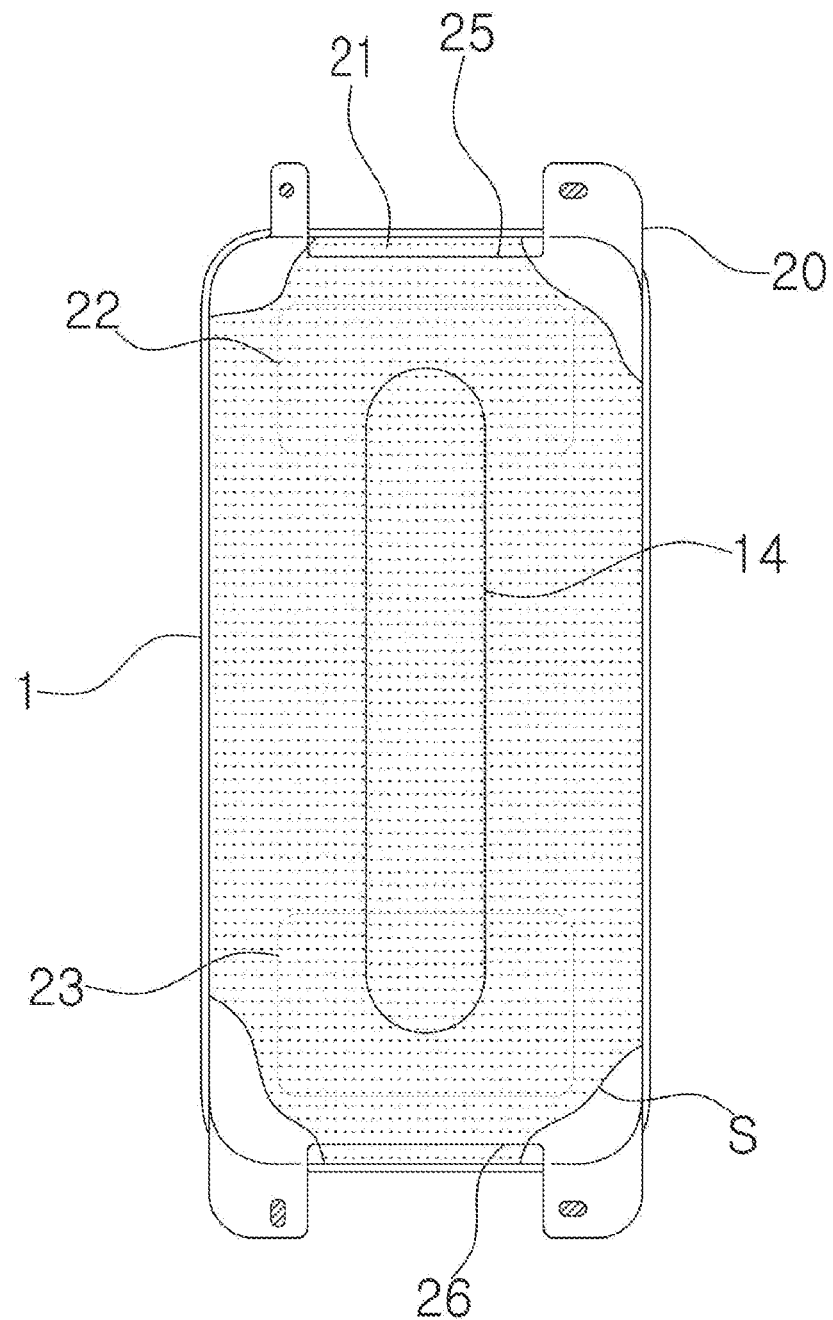

In addition, with reference to FIGS. 6 and 7, the second one-side-open rectangular through-hole 26 also has a smaller width than the second rectangular through-hole 23. As a result, the dispersion adhesion S proceeds in the direction from the second rectangular through-hole 23 to the second one-side-open rectangular through-hole 26.

Accordingly, with reference to FIGS. 5 to 8, only the movement of the user's finger 3 enables the dispersion adhesion S that expands an attachment area from the center of the display 2 up to a corner of the display 2.

Figure 9:
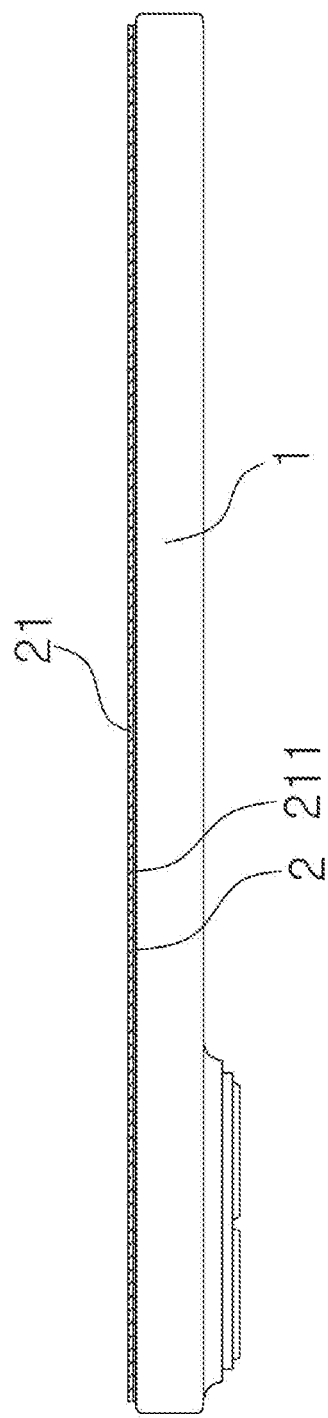
FIG. 9 is a side view illustrating a state where the electrostatic protective film is attached to the display of the terminal.

With reference to FIG. 9, when the position setting plate 11 and the auxiliary member 20 are separated from the terminal 1 by being raised therefrom, only the protective film 21 remains attached on the display 2. As a result, the protective film 21 is fully attached on the display 2.

The film attachment device provides the advantages of adhering the protective film 21 at the required position of the protective film 21 on the display 2, facilitating discharging of air between the attachment surface 211 and the display 2 to the outside, and suppressing air bubbles from being formed between the attachment surface 211 and the display 2.

A sticker that extends in the forward-backward direction in such a manner as to cover the top of the longitudinal hole 14 may be attached on an upper surface of the position setting plate 11. An adhesive agent may be formed on the bottom surface of the sticker exposed at a lower surface of the position setting plate 11 through the longitudinal hole 14. Thus, the sticker may be adhered to the upper surface of the auxiliary member 20 that is arranged within the position setting space 13.

At this point, the upper surface of the protective film 21 remains adhered to the lower surface of the auxiliary member 20. As a result, when, on the same vertical line, the position setting plate 11 is arranged on a relatively higher horizontal line than the auxiliary member 20 and the protective film 21 is arranged on a relatively lower horizontal line than the auxiliary member 20, the position setting plate 11, the auxiliary member 20, and the protective film 21 can remain adhered to each other.

In addition, the terminal 1 needs to be arranged within the position setting space 13 in a state where the sticker, the position setting plate 11, the auxiliary member 20, and the protective film 21 are adhered to each other. To this end, the sticker, the position setting plate 11, the auxiliary member 20, and the protective film 21 are lowered. Then, the user's finger 3 moves the auxiliary member 20 or the protective film 21 in the forward-backward direction while pressing against the auxiliary member 20 or the protective film 21 through the longitudinal hole 14, with the user's finger 3 pushing down the sticker. This movement adheres the protective film 21 to the display 2 in a dispersing manner.

In a state where the protective film 21 is adhered to the display 2, the sticker is removed. Then, when the position setting plate 11 is separated from the terminal 1, the auxiliary member 20 and the protective film 21 are separated from the position setting plate 11. Then, the auxiliary member 20 is separated from the protective film 21, thereby finishing a process of attaching the protective film 21 to the display 2.

The preferred embodiment of the present disclosure is described above only in an exemplary manner with reference to the accompanying drawings. Additionally, the configurations of the preferred embodiment are illustrated only in an exemplary manner in the accompanying drawings. Therefore, the preferred embodiment does not implement all aspects of the technical idea of the present disclosure. It should be understood that there may be various equivalents and modifications to the preferred embodiment at the time of filing the present patent application. Therefore, it should be understood that the preferred embodiment is illustrative and non-restrictive in all respects. The scope of the present disclosure is defined in the following claims rather than the detailed description provided above. Alterations of, modifications to, and equivalents to the embodiment that are derived from the detailed description and the following claims should be interpreted as being included within the scope of the present disclosure.

What is claimed is:

1. A film attachment device comprising:
    a position setting plate including:
    a main body having a longitudinal hole extending in a forward-backward direction, and
    a plurality of elastic members, each having a first end portion and a second end portion,
    wherein the first end portions of the plurality of elastic members protrude downward from the main body and are spaced apart from each other to surround a position setting space, and the second end portions of the plurality of elastic members extend upward toward the main body and are configured to come into close contact with a terminal which is to be inserted into the position setting space;
    an auxiliary member having first and second rectangular through-holes positioned apart from each other to be exposed to an outside through the longitudinal hole, wherein the auxiliary member is disposed on a lower surface of the main body; and
    a protective film disposed to cover bottoms of the first and second rectangular through-holes,
    wherein the auxiliary member has a first one-side-open rectangular through-hole at one front portion of the auxiliary member, which is adjacent to the first rectangular through-hole, and
    wherein the auxiliary member has a second one-side-open rectangular through-hole at one rear portion of the auxiliary member, which is adjacent to the second rectangular through-hole.

2. The film attachment device of claim 1,
    wherein, when an external force moves in the forward-backward direction while pressing against the protective film or the auxiliary member through the longitudinal hole, the protective film is configured to be adhered to a display in a dispersing manner from a center thereof up to an edge thereof.

3. The film attachment device of claim 1,
    wherein one front portion and one rear portion of the protective film are exposed to a space over the auxiliary member through the first and second one-side-open rectangular through-holes, respectively.

4. The film attachment device of claim 1, wherein the position setting plate further comprises: a guide unit coupled, at a position spaced apart from the position setting space, to the lower surface of the main body.

5. The film attachment device of claim 1, wherein the main body has a protrusion on the lower surface of the main body, the protrusion being configured to pass through the auxiliary member and to be coupled to the auxiliary member.

6. The film attachment device of claim 1, wherein the protective film has an attachment surface on a lower surface of the protective film, the attachment surface being configured to be spaced apart from a display of the terminal when the terminal is inserted into the position setting space.

7. The film attachment device of claim 6, wherein the first and second rectangular through-holes are spaced apart from each other along the forward-backward direction at a center portion of the auxiliary member.

\* \* \* \* \*